United States Patent [19]

Ressmeyer

[11] 4,210,952
[45] Jul. 1, 1980

[54] PORTABLE ILLUMINATION SOURCE FOR PHOTOGRAPHERS

[76] Inventor: Roger H. Ressmeyer, 679-4th Ave., San Francisco, Calif. 94118

[21] Appl. No.: 880,385

[22] Filed: Feb. 23, 1978

[51] Int. Cl.² .............................................. G03B 15/02
[52] U.S. Cl. ........................................ 362/17; 362/16; 362/106; 362/355; 362/296
[58] Field of Search .................. 362/16, 106, 17, 296, 362/355; 354/126

[56] References Cited

U.S. PATENT DOCUMENTS

| 1,757,887 | 5/1930 | Wheat | 362/106 |
| 2,943,186 | 6/1960 | Weiss | 362/106 |
| 3,435,556 | 4/1969 | Clarke | 362/106 |
| 3,781,535 | 12/1973 | Larson | 362/16 |
| 3,953,725 | 4/1976 | Ketter et al. | 362/106 |

*Primary Examiner*—Benjamin R. Padgett
*Assistant Examiner*—J. L. Barr
*Attorney, Agent, or Firm*—Thomas H. Olson

[57] ABSTRACT

A portable illumination source for photographers which can be worn on the head of the photographer and there retained without attention by the photographer so that he can use both hands for manipulating his camera. The device includes a rigid frame on which is mounted a light source such as a photoflash to produce light rays on a path and a diffuser secured to the rigid frame within the path to diffuse light toward a subject that the photographer is facing. A suspension system for securing the rigid frame to the head of the photographer such that the apparatus can be employed without attention from the photographer.

8 Claims, 4 Drawing Figures

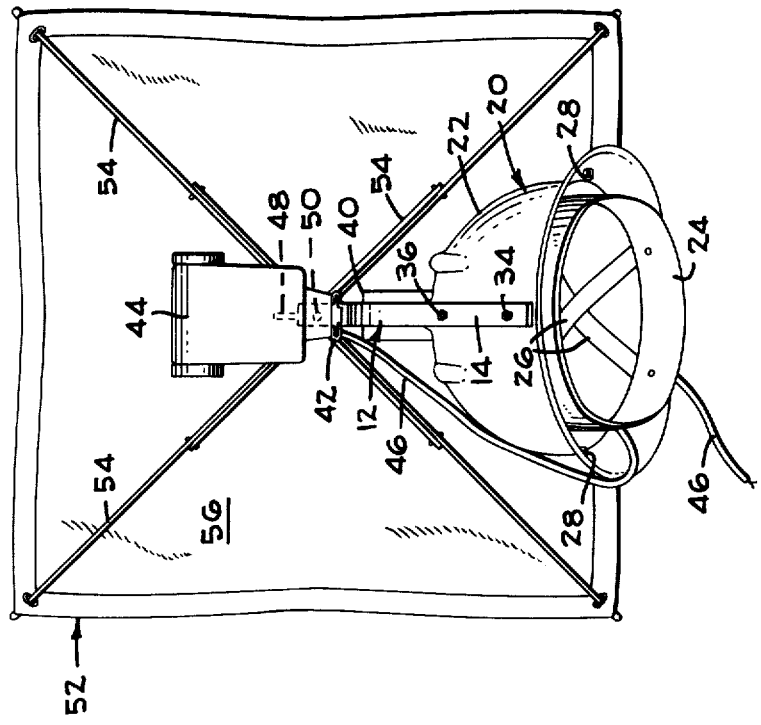
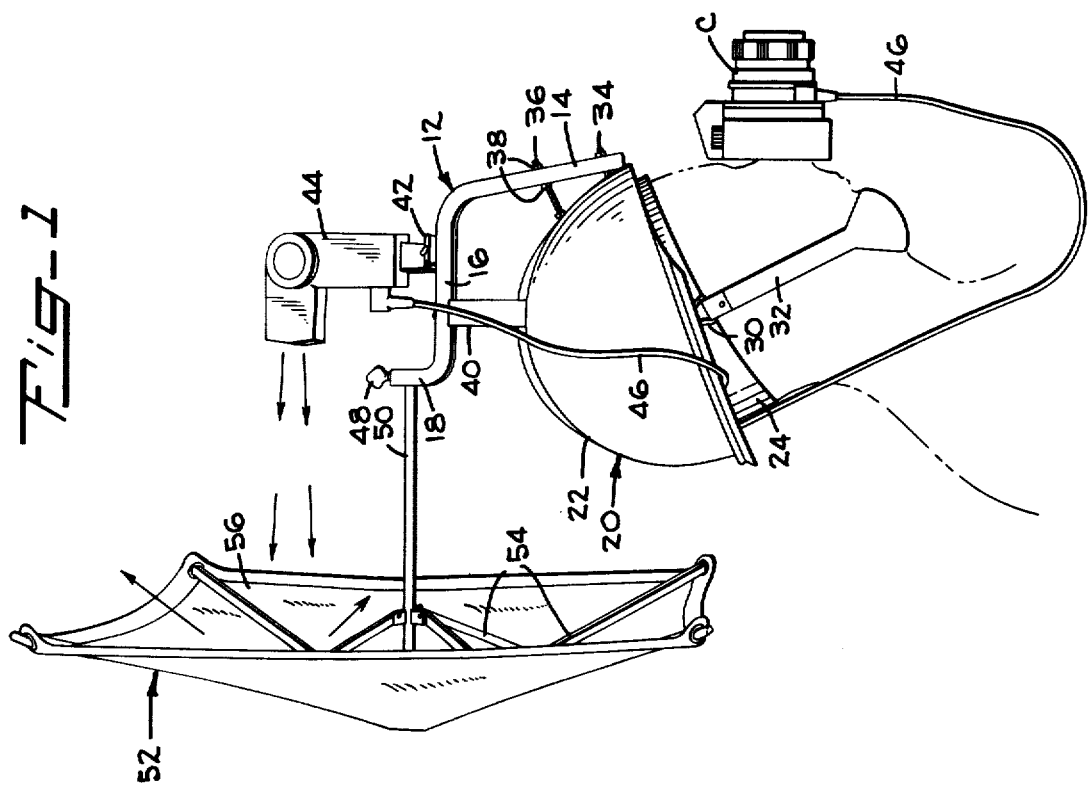

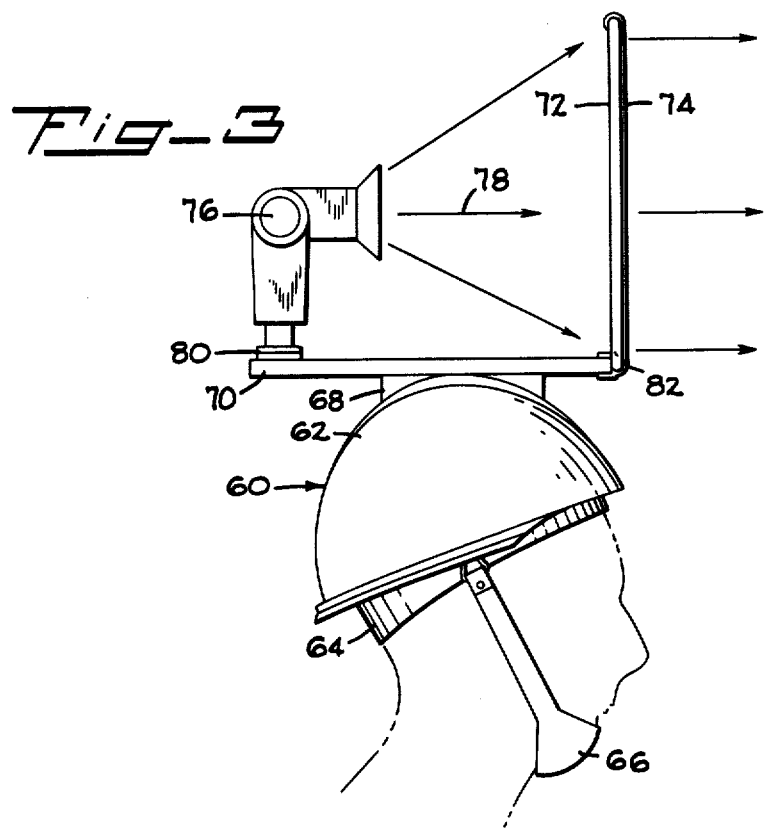
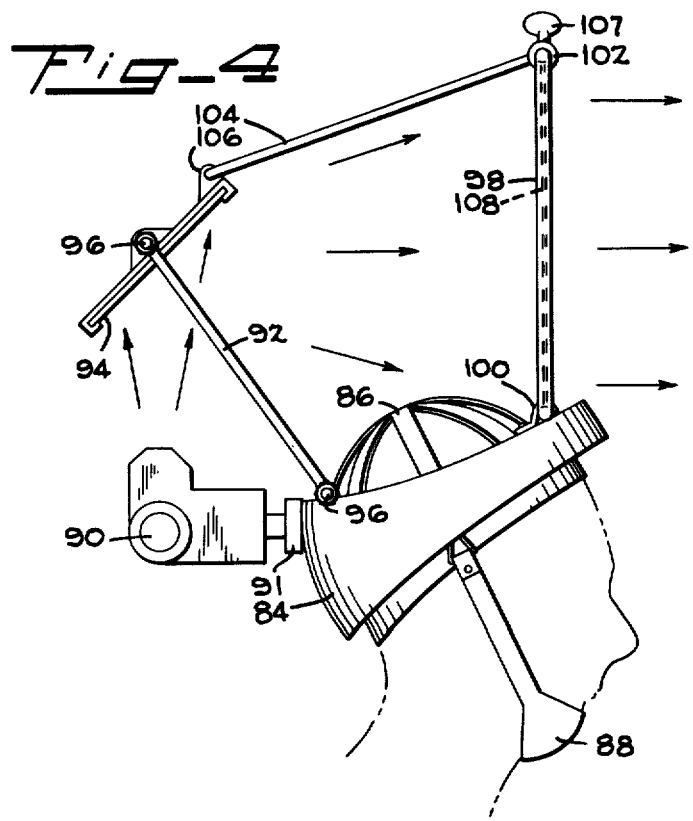

PORTABLE ILLUMINATION SOURCE FOR PHOTOGRAPHERS

BACKGROUND OF THE INVENTION

1. Field of the Invention

This invention relates to a portable illumination source for a photographer and more particularly to such source which can be supported on the photographer's head without the use of the photographer's hands so as to leave the hands free to manipulate the camera.

2. Description of the Prior Art

U.S. Pat. No. 3,781,535 (240/1.3) discloses a light reflector that can be clamped to a camera. Because the light reflector is cumbersome, the photographer must use one of his hands to support the reflector thereby necessitating manipulation of the camera by only one hand. Although the patented reflector performs the valuable function of diffusing the light that impinges on the subject, it is difficult for a photographer to manipulate in view of the fact that one of the photographer's hands must be used to support the reflector.

Also in the prior art are miner's caps which have lantern supporting means thereon, such being exemplified by U.S. Pat. Nos. 1,055,746 and 3,302,018. These miner's caps, however, have the light directed from a small source directly toward the front of the miner and although they are useful for miners, they are not suitable for photographers.

SUMMARY OF INVENTION

Although the superiority of diffused light for photographing human subjects is well known, advantages of such indirect lighting have not been available in portable photography because of the weight of reflectors and/or diffusers. Thus many photographs taken of news events lack the quality that is possible when a subject can be photographed in a studio. The above cited U.S. Pat. No. 3,781,535, although providing an improvement of news photographs and the like, is difficult to use because the structure requires the photographer to use one of his hands to support the reflector.

According to the present invention a light source and a diffuser therefor are supported on the photographer's head by a mounting system that leaves both of the photographer's hands free to manipulate the camera. Thus the principal object of the present invention is to provide an illumination source for photographers that provides the benefits of diffused lighting while requiring no manual support by the photographer so that both hands can be used to manipulate the camera. This object is achieved by providing a rigid frame, means to support the frame on the photographer's head and a light source and diffuser on the frame that are spaced above and behind the photographer's head.

Contributing to the balance of the illumination source of the invention is the fact that the elements referred to in the preceding sentence are arranged so that their combined center of gravity is rearward of the midpoint of the photographer's head so that a chin strap, which is loaded in tension, effects stabilization of the illumination source without manual attention from the photographer.

Another object is to provide a portable illumination source for a photographer which can be folded compactly when not in use. This object is achieved because the structure is adapted to employ the umbrella-like reflector apparatus disclosed in U.S. Pat. No. 3,781,535 or like foldable diffuser support structure.

A feature and advantage of the device of the invention is that the diffuser is substantially uniformly positioned with respect to the photographer's face at all times so that the intensity and distribution of illumination will be constant irrespective of the manner in which the photograher holds the camera.

The foregoing, together with other objects, features and advantages, will be more apparent after referring to the following specification and the accompanying drawing.

BRIEF DESCRIPTION OF THE DRAWING

FIG. 1 is a side view of one embodiment of an illuminating source embodying the invention.
FIG. 2 is a front view of the device shown in FIG. 1.
FIG. 3 is a side view of another embodiment.
FIG. 4 is a side view of yet another embodiment.

DESCRIPTION OF THE PREFERRED EMBODIMENT

Referring more particularly to the drawings and to the embodiment of FIGS. 1 and 2, reference numeral 12 indicates a rigid bar constructed of aluminum or like material of suitable strength and having a generally vertically extending portion 14 and a generally horizontally extending portion 16. At the rear extremity of horizontal portion 16 is an upstanding vertical leg 18 which is integral with horizontal portion 16 and vertical portion 14. Bar 12 is fixed to a head engaging structure, exemplified in the drawing by a more or less conventional hard hat 20. Hard hat 20 includes a rigid shell 22 to the interior of which is fastened a head encircling suspension harness 24. Suspension harness 24 includes cross straps 26 which extend over the top of the wearer's head and serve to space rigid shell 22 from the top of the wearer's head. Interior of rigid shell near the lower rim thereof are right and left bosses 28 which are apertured to engage chin strap loops 30. The loops engage a chin strap 32 which is flexible and passes under the photographer's chin as shown in FIG. 1. Chin strap 32 resists tension applied thereto so as to retain hard hat 20 on the photographer's head in a straight position.

Vertically extending bar portion 14 is secured to rigid shell 22 at the front thereof and above the photographer's face. For this purpose there is a lower mounting bolt 34 which retains the lower extremity of the vertically extending bar portion in substantial contact with rigid shell 22. Spaced above lower mounting bolt 34 is an upper mounting bolt 36 which has one end secured to rigid shell 22 and the other end provided with two mounting nuts 38. Vertically extending bar portion 14 is apertured to receive upper mounting bolt 36 therethrough, and the nuts secure the rigid bar 12 to shell 22 so that horizontally extending portion 16 of the bar is substantially horizontal when the device is in place on the photographer's head. For enhancing the rigidity between bar 12 and shell 22 there is a spacer block 40 having its lower end secured at or near the midpoint of shell 22 and its upper end secured to horizontally extending bar portion 16 in spaced relation from the intersection of the horizontally extending bar portion with vertically extending portion 14.

Intermediate the intersection and spacer bar 14 is fixed a mounting socket 42 of more or less conventional form which is adapted to removably support on horozontally extending bar portion 16 a conventional photographer's light source 44 which is provided with a clamping device engagable with socket 42. Light source 44, as is conventional, includes batteries, a light source, focusing optics, and a cord 46 adapted for connection to a camera C so as to time the actuation of the light source in synchronism with camera actuation. One suitable commercially available light source is a Vivitar 283 electronic flash. Cord 46 is secured to head encircling suspension harness 24 in the rear portion thereof to retain cord 46 clear of the photographer's face.

Upstanding vertical leg 18 defines a horizontally oriented bore with which the inner end of a clamping screw 48 communicates thus to form a site on rigid bar 12 to secure a rod 50 that constitutes a part of a light diffuser and reflector 52 of the type described in more detail in the above cited U.S. Pat. No. 3,781,535. Secured to rod 50 at the rearward end thereof are foldable radially extending ribs 54 to the outer ends of which are secured the perimeter of a fabric sheet 56. The front surface of sheet 56 is coated with silver material or the like so that light incident on such surface from light source 44 will be diffused and reflected forwardly to a subject in front of the photographer. Fabric sheet 56 is supported to form a generally planar surface that is substantially parallel to the photographer's face and that resides generally perpendicular to the light rays emanating from light source 44. As can be seen in the figure, the portions of rigid bar 12 are dimensioned such that the midpoint of fabric sheet 56, i.e., a point in alignment with rod 50, is spaced above the photographer's head so that sufficient light will be reflected toward a subject in front of the photographer.

In operation light source 44 is engaged with socket 42, ribs 54 are extended to the position shown in the drawings and light diffuser and reflector 52 is mounted to bar 12 by manipulation of clamp screw 48. As can be seen, the distance between light source 44 and fabric sheet 56 can be adjusted by sliding rod 50 within the bore formed in upstanding vertical leg 18. Because of the dimensions and orientations of the elements constituting the present invention, the center of gravity of the structure is rearward of the midpoint of the wearer's head and rigid shell 22. Thus when hard hat 20 is donned and chin strap 32 is engaged with the photographer's chin (see FIG. 1), the chin strap will be in tension because the center of gravity of the device produces a moment in a counterclockwise direction as viewed in FIG. 1 which moment is resisted by the tension in the chin strap. The photographer is thus free to move about to select subjects for exposure and at all times both of the photographer's hands are free to manipulate and aim camera C. Because the majority of the surface of fabric sheet 56 is above the photographer's head, adequate light from light source 44 will be reflected and diffused toward a subject in front of the photographer. Accordingly the benefits of indirect illumination of a subject, which were heretofore feasible only in a studio setting, are possible with the portable illumination affording apparatus of the invention.

The embodiment of the invention shown in FIG. 3 includes a hardhat 60 which is composed of a rigid shell 62, a head encircling suspension harness 64 and a chin strap 66; these elements are substantially identical to the equivalent elements in the embodiment of FIG. 1. Fixed to the top portion of rigid shell 62 is a mounting block 68 on which is supported a rigid bar 70 which constitutes a part of the frame for supporting the light diffuser upon the photographer's head. At the forward end of bar 70 is supported a frame 72 which can be of square, circular or any other suitable configuration. The frame supports the periphery of a diffuser sheet 74 which is formed of thin white cloth or like material that at least partially transmits light impinging on one side thereof and partially diffuses the light. On the rear end of bar 70 is supported a light source 76 which is equivalent to the light source identified in FIG. 1 by reference numeral 44. The light source produces light rays on a path 78 which path extends through diffuser sheet 74 and to the subject to be photographed in front of the photographer's face. Because diffuser sheet 74 is approximately parallel to the photographer's face, the subject that the photographer faces will be illuminated with relevantly soft diffused light so as to contribute to achievement of the purposes of the invention. Light source 76 is support to frame 70 by a socket 80 of conventional form so that the light source can be removed from the bar. Frame 72 is fastened to the front end of the bar by means of a pivot connection 82 to permit the frame to be folded flat against the bar and to enhance portability of the device.

The operation of the embodiment shown in FIG. 3 is substantially identical to that described hereinabove in connection with FIGS. 1 and 2. With the light source 76 mounted on bar 70 and with frame 72 folded into the upright position as shown, the subject at which the photographer looks will be illuminated. Of course, a cord (not shown) is connected to light source 76 for affording synchronization between the camera used by the photographer and the light source. Because the light passes through diffuser sheet 74 the glare thereof is eliminated wherefore the subject is properly illuminated for photographing. Moreover, because the light source is relatively heavy, the center of gravity of the entire structure is rearward of the midpoint of the photographer's head thereby tensioning chin strap 66 to permit the device to be stably supported on the photographer's head without requiring that the photographer use his hands to support and/or aim the device.

The embodiment shown in FIG. 4 includes a truncated hardhat shell 84 which is supported on the photographer's head by means of a head encircling suspension harness 86 and a chin strap 88, the latter two elements being substantially identical to those shown and described above in connection with FIGS. 1-3. To the rear of truncated shell 84 is removably secured a light source 90, there being a socket 91 for achieving this purpose. Extending upward and rearward from the rear lateral portions of truncated shell 84 are two support rods one of which is seen in FIG. 4 at 92. The support rods 92 are symmetrical of the center line of the device so the showing of one of the support rods in FIG. 4 is adequate to afford complete understanding of the structure. At the free end of support rod 92 is fixed a mirror or like reflector 94, there being pivotally adjustable bolted connections 96 at each end of the support rods to position mirror 94 so that light emanating from light source 90 is reflected forwardly. Extending upward from the forward portion is truncated shell 84 is a frame 98 which is engaged to the truncated rigid shell by means of identical clips one of which is seen at 100. The upper end of frame 98 is supported by a sleeve 102 which is rigid with a support rod 104 the rear end of which is formed to a hook portion for removably engaging a projection 106 on reflector 94. Sleeve 102 has a thumb screw for clamping the sleeve to frame 98. Thus rod 104 supports frame 98 and mirror 94 with respect to one another. Interior of frame 98 is a diffuser sheet 108 which is equivalent to diffuser sheet 74 shown in FIG. 3 and which transmits light impinging on the rear surface thereof from path 110 and diffuses the light so that the subject faced by the photographer is uniformly illuminated without glare.

The device is assembled as shown in FIG. 4 by engaging frame 98 with clips 100, engaging the hook portion of rod 104 to projection 106, tightening thumb screw 107 to fix sleeve 102 to frame 98, and tightening the nuts at opposite ends of support rod 92. Thus, reflector 94 is positioned so that light produced by light source 90 will be reflected along path 110 for diffusion by diffuser sheet 108. The light source 90 is engaged onto truncated shell 84 at socket 91. Chin strap 88 is engaged around the chin of the photographer and the device is ready to use without interfering in any way with the photographer's use of both hands to manipulate the camera. Because light source 90 is mounted at the rear of truncated rigid shell 84, the center of gravity of the entire assembly is behind the midpoint of the photographer's head so that chin strap 88 is tensioned. Consequently, the structure remains in place notwithstanding relatively vigorous movements by the photographer. Diffuser sheet 108 is supported in a plane substantially parallel to the photographer's face so that when the photographer looks at a subject while aiming the camera the diffused light transmitted through diffuser sheet 108 will illuminate the subject. The apparatus can be folded for transportation and storage by loosening thumb screw 102, disengaging the hook portion of rod 104 from projection 106, disengaging frame 98 from clips 100, and folding rod 104 against the frame. Loosening the nuts at the ends of rod 92 permits the rod and reflector 98 to be folded against truncated shell 84 for convenient storage and/or transportation.

Thus it will be seen that the invention provides a photographer's illumination system which is portable, which illuminates subjects with diffused light, as contrasted with direct light, and which can be transported by the photographer without the use of his hands. Because of the cooperation between the location of the center of gravity of devices embodying the invention and the tension in the chin strap, the photographer can assume virtually any position necessitated by the location and nature of the subject to be photographed without dislodging the illumination apparatus from his head and without requiring use of his hand or hands to steady the device. Although several embodiments of the invention have been shown and described by way of example, it will be obvious that other adaptations and modifications can be made without departing from the true spirit and scope of the invention.

What is claimed is:

1. Portable apparatus for use by a photographer for illuminating a photographic subject in front of the photographer comprising a frame, a light source secured to the frame for producing light rays along a path, diffusing means mounted on said frame within and substantially perpendicular to said path for diffusing light rays produced by said source, said diffusing means having a generally planar surface and being oriented approximately parallel to the photographer's face, and means for securing the frame to the photographer's head, said means including a chin strap for engaging the chin of the photographer, said frame, light source and diffusing means having a combined center of gravity rearward of the midpoint of the photographer's head and said chin strap being fastened to said frame forward of the midpoint to tension the chin strap.

2. Apparatus according to claim 1 wherein said frame includes a generally horizontal rigid bar having a forward end and a rear end, said light source being mounted on the rear end and being directed forward, said diffusing means being mounted on the forward end and including a rigid frame fixed to the bar and a diffusing sheet supported within the frame and in the path of light emanating from the light source, said diffusing sheet affording transmission and diffusion of light therethrough to a site forward of the photographer's face.

3. Apparatus according to claim 1 wherein said frame includes a rigid shell circumscribing the photographer's head, wherein said light source is mounted to the rear of said rigid shell so as to direct light rays produced thereby in an upward direction and wherein said diffusing means includes a frame mounted on the forward portion of said rigid shell, said frame supporting a diffusing sheet therein and a light reflector and means for supporting said light reflector above said light source and behind said diffusing sheet so that light emanating from said light source is reflected by said reflector along a path through said diffusing sheet.

4. Apparatus according to claim 1 wherein said securing means includes a hard hat including a rigid shell and a suspension system for supporting the shell on the photographer's head, and wherein said chin strap is secured to said rigid shell.

5. Apparatus according to claim 1 wherein said light source is mounted adjacent the forward portion of said frame and is directed rearward and wherein said diffusing means includes a reflector secured to the frame rearward of said light source in light receiving relation thereto for reflecting and diffusing light incident thereon forwardly off the photographer's face.

6. Apparatus according to claim 5 wherein said frame includes a rigid bar having a substantially vertically extending portion fixed to the front of said rigid shell and extending upward therefrom and a substantially horizontal portion extending rearward of said vertical portion, spacer means secured substantially centrally of said rigid shell and fixed to said horizontal bar portion and means intermediate said vertical portion and said spacer means for removably mounting said light source to said horizontal bar portion.

7. Apparatus according to claim 6 wherein said horizontal bar portion terminates at a site rearward of the midpoint of the photographer's head, a rigid rod mounted to said bar at said site, said rod extending rearward of said site and supporting said reflector in light receiving relation to said light source, said reflector being substantially symmetrical to said rod so that the majority of the surface thereof is above and behind the photographer's head.

8. Portable apparatus for affording illumination of a subject in front of a photographer comprising a frame, means for securing the frame on the photographer's head so that said frame extends upward and rearward thereof, a light source mounted on the frame and directed rearward, and a reflector secured to the frame in light receiving relation to the light source for reflecting and diffusing light incident thereon toward the subject, the center of gravity of said frame, light source and reflector being rearward of the midpoint of the photographer's head so as to produce a moment thereon in a direction upwardly away from the photographer's face, said securing means including tension resisting means engagable with photographer's chin for counteracting said moment, said reflector being mounted so that the majority of the reflective surface thereof is above the top of the photographer's head.

* * * * *